United States Patent Office 3,397,167
Patented Aug. 13, 1968

---

3,397,167
POLYMER STABILIZATION WITH 1,4,7,9b-TETRA-AZAPHENALENE COMPOUNDS
Jerry T. Gruver, Bartlesville, Okla., assignor to Phillips Petroleum Company, a corporation of Delaware
No Drawing. Filed June 29, 1964, Ser. No. 378,938
9 Claims. (Cl. 260—33.6)

ABSTRACT OF THE DISCLOSURE

Stabilization of polymers including carbon black containing rubbers with 1,4,7,9b-tetraazaphenalene compounds as antioxidants.

---

This invention relates to the stabilization of polymeric materials. In accordance with another aspect, this invention relates to polymeric compositions containing carbon black subject to oxidative degradation stabilized against such degradation by the addition thereto of certain tetraazaphenalenes. In accordance with another aspect, this invention relates to a method for inhibiting oxidation of polymeric materials by incorporating therein a stabilizing amount of a tetraazaphenalene compound. In accordance with a further aspect, this invention relates to the stabilization of polymeric materials containing carbon black and extender oils by the addition thereto of a tetraazaphenalene compound. In accordance with a further aspect, this invention relates to the stabilization of polymeric materials containing a high percentage of cis-1,4-addition by incorporating therein a stabilizing amount of a tetraazaphenalene compound. In accordance with still a further aspect, this invention relates to the preservation of cis-polybutadiene-carbon black masterbatches by incorporating therein a tetraazaphenalene compound.

Natural and synthetic rubbers, as well as polyolefins, are subject to oxidative degradation when exposed to an oxygen-containing atmosphere, particularly at elevated temperatures and/or in the presence of actinic light. This oxidative degradation is accelerated by the presence of reinforcing agents, such as carbon black, in polymeric masterbatches. Such degradation results in loss of processability, embrittlement, loss of tensile strength and elongation, detrimental color changes, decrease in inherent viscosity, increase in percentage gel, decrease in swelling index, and the like. Thus, it can be seen that there is a general deterioration in the physical properties of such polymers. Numerous additives have been proposed for inhibiting such oxidative degradation, most of which, while possibly effective for some compositions, have many shortcomings. U.S. Patents 2,388,562, A. M. Neal et al., issued Nov. 6, 1945, Re. 19,654, M. C. Reed, reissued July 23, 1935, and 2,705,224, E. L. Hill et al., issued Mar. 29, 1955, all disclose various aromatic amines as rubber antioxidants and antioxidants. Because of the presence of reinforcing agents, such as carbon black in many polymer compositions, the shortcomings of some known inhibitors are especially apparent in attempting to prevent or slow down oxidative degradation of polymeric-carbon black masterbatches.

The present invention relates to novel antioxidants which are highly effective in stabilizing polymers subject to oxidative degradation against oxidative degradation.

Accordingly, an object of this invention is to provide polymeric materials stabilized against oxidation.

Another object of this invention is to provide a method for stabilizing polymers such as natural and synthetic rubbers and polyolefins against oxidative degradation.

Another object of this invention is to provide new compositions of matter and to advance the polymer art.

Still another object of this invention is to provide novel antioxidants for stabilizing polymers containing carbon black subject to oxidative degradation.

Other objects, aspects, as well as the several advantages of this invention, will become apparent to those skilled in the art upon a study of this disclosure and the appended claims.

In accordance with present invention it has now been found that polymers subject to oxidative degradation can be stabilized against such degradation by incorporating therein a stabilizing amount of certain tetraazaphenalene compounds.

More specifically, in accordance with the present invention, it has been found that polymers such as natural rubber and solid and rubbery synthetic polymers formed by polymerizing monomers containing a vinylidene group ($H_2C=C<$) can be stabilized against oxidative degradation by incorporating therein a stabilizing amount of a 1,4,7,9b-tetraazaphenalene compound having the structural formula:

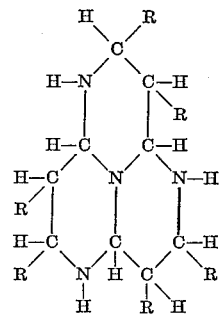

wherein R is hydrogen or a monovalent hydrocarbon radical selected from saturated aliphatic, saturated cycloaliphatic, and aromatic radicals, containing up to and including 12 carbon atoms. In the above formula hydrocarbon radicals containing from 1 to 8 carbon atoms, inclusive, are presently preferred.

Representative examples of suitable 1,4,7,9b-tetraazaphenalenes that can be used as antioxidants according to the invention include:

Dodecahydro-1,4,7,9b-tetraazaphenalene,
2,5,8-trimethyldodecahydro-1,4,7,9b-tetraazaphenalene,
2,5,8-triisobutyldodecahydro-1,4,7,9b-tetraazaphenalene,
2,5,8-triphenyldodecahydro-1,4,7,9b-tetraazaphenalene,
3,6,9-triethyldodecahydro-1,4,7,9b-tetraazaphenalene,
3,6,9-tricyclopentyldodecahydro-1,4,7,9b-tetraazaphenalene,
2,3-diethyldodecahydro-1,4,7,9b-tetraazaphenalene,
3-n-butyldodecahydro-1,4,7,9b-tetraazaphenalene,
2,6-di-n-hexyldodecahydro-1,4,7,9b-tetraazaphenalene,
3,6,9-tri-tert-octyldodecahydro-1,4,7,9b-tetraazaphenalene,
2,5-dimethyl-9-isopropyldodecahydro-1,4,7,9b-tetraazaphenalene,
3,6-dibenzyldodecahydro-1,4,7,9b-tetraazaphenalene,
3(2-phenylethyl)dodecahydro-1,4,7,9b-tetraazaphenalene,
2,6-di(4-methylcyclohexyl)dodecahydro-1,4,7,9b-tetraazaphenalene,
3(4-tolyl)dodecahydro-1,4,7,9b-tetraazaphenalene,
2,5-di(2,3-dimethylhexyl)-dodecahydro-1,4,7,9b-tetraazaphenalene,
2(2,6-diethylphenyl)dodecahydro-1,4,7,9b-tetraazaphenalene,
2,3,5,6,8,9-hexamethyldodecahydro-1,4,7,9b-tetraazaphenalene,
2,5-diethyl-3,6-di-n-butyldodecahydro-1,4,7,9b-tetraazaphenalene, 3,6-di-n-propyl-9-phenyldodecahydro-1,4,7,9b-tetraazaphenalene,
3-n-dodecyl-1,4,7,9b-tetraazaphenalene, and the like.

The stabilizers or antioxidants of the invention can be incorporated into the polymer to be stabilized in any desired amount depending upon the conditions under which the polymer is to be used. However, the total amount of stabilizer required to produce the desired stabilizing effect has been found to be relatively small and will generally range from 2 to 20 millimols per 100 weight parts of polymer, with the preferred amount being in the range of 4 to 15 millimols per 100 weight parts of polymer.

The tetraazaphenalene compounds employed as stabilizers according to the invention can be prepared by any method known in the art. Also, the stabilizers of the invention can be incorporated into the polymer to be stabilized by any suitable means, such as hot milling in a roll mill or hot mixing in a Banbury mixer, solution-blending, and the like.

The materials that can be stabilized according to the invention include, in general, polymeric materials that are subject to oxidative degradation. Preferably, the polymeric materials that can be stabilized according to the invention include natural rubber and synthetic polymers formed from conjugated dienes and monoolefins containing carbon black.

The preferred class of polymers stabilized according to the invention include both homopolymers and copolymers of conjugated dienes having from 4 to 12 carbon atoms, preferably conjugated dienes having from 4 to 8 carbon atoms per molecule such as 1,3-butadiene, isoprene, piperylene, methylpentadiene, 2-methyl-1,3-hexadiene, phenylbutadiene, 3,4-dimethyl-1,3-hexadiene, 4,5-diethyl-1,3-octadiene, and the like. Among these butadiene, isoprene, and piperylene are preferred. In addition, suitable polymeric materials that can be stabilized include copolymers of the above-mentioned conjugated diene with compounds containing a vinylidene group ($H_2C=C<$) such as isobutylene, styrene, p-methoxystyrene, vinylnaphthalene, vinyltoluene heterocyclic nitrogen-containing monomers such as pyridine and quinoline derivatives containing at least one vinyl or alpha-methylvinyl group, such as 2-vinylpyridine and 2-methyl-5-vinylpyridine, acrylic and alkacrylic acid esters, such as methyl acrylate, ethyl acrylate, and methyl methylacrylate, methyl vinyl ether, vinyl chloride, vinylidene chloride, and the like.

The antioxidants of the invention can also be used to stabilize polymers of monoolefins having from 2 to 8 carbon atoms such as polyethylene, polypropylene, polybutene, copolymers of ethylene with propylene, 1-butene, and the like. These synthetic polymers of monomers containing a vinylidene group ($H_2C=C<$) can be made by a number of well known processes. Emulsion polymerization of butadiene and vinylidene-containing monomers such as styrene and the vinylpyridines, for example, is a well established process. Mass or solution polymerization employing various catalyst systems are likewise known methods of preparing polymers of mono and diolefins, for example, polyethylene, polypropylene, polybutadiene, polyisoprene, ethylene-propylene rubber, ethylene-propylene terpolymer rubber, and the like.

As indicated previously, the present invention is preferably applicable to the stabilization of polymeric compositions subject to oxidative degradation containing pigments or reinforcing agents such as carbon black. The invention is particularly useful in stabilizing polymer-carbon black masterbatches, including oil-extended masterbatches. The carbon black employed can be any of the types including both channel and furnace black, lamp black, and the like. Where reference is made to carbon black or carbon particles, this term should be understood to include all forms of carbon which have been found effective for reinforcing or light shielding in polymeric materials. The particle size of the carbon black preferably does not exceed about 1000 Angstroms. Although the invention is discussed in terms of carbon black, the teachings of the invention obviously can be practiced with advantage to the incorporation of other prime reinforcing and extended pigments. Other pigments which are obtained as insoluble particulate solids, such as zinc oxide, titanium dioxide, clays, hydrated alumina, precipitated calcium carbonates, and the like, can be used instead of carbon black or together with carbon black when desired.

The amount of pigment or carbon black employed in reinforcing polymeric materials will vary appreciably depending upon the particular polymeric material being extended. For example, polymers of conjugated dienes can contain up to about 250 weight parts of carbon black per 100 weight parts of polymer and often will contain from 10 to about 150 weight parts per 100 parts of polymer. Polymers of monoolefins often contain small amounts of carbon black for light shielding purposes and the amount of carbon black employed generally will be in the range of from about 0.5 to about 10 weight parts per 100 weight parts of polymer, although amounts outside this range can be employed when desired. It is often preferred to employ from about 1 to about 5 weight parts of carbon black per 100 parts of polymers of monoolefins. Thus, the amount of carbon black employed in polymers applicable according to the invention can range from 0.5 to 250 weight parts per 100 parts of polymer, preferably from 1 to 150 weight parts.

"Rubber reinforcing black," or "rubber reinforcing carbon black" are generic terms and are given to any of a large variety of carbon blacks that are used in the formulation of polymer compositions, which carbon blacks are applicable to masterbatches of the invention. These blacks are available through normal commercial channels in a large variety of trade names and/or type names as "easy processing channel black," "medium processing channel black," "hard processing channel black," "high abrasion furnace black," "super abrasion furnace black," "intermediate super abrasion furnace black," "high modulus furnace black," "semi-reinforcing black," and others, which are all characterized by their known utility in the compounding of rubber formulations. These blacks differ by the method of preparing them and/or their average particle sizes and their use in rubber formulations is a matter of choice depending upon the particular rubber that one desires to produce. The present invention is particularly directed to the stabilization of polymeric-carbon black masterbatches containing any of the above-described carbon blacks.

The above-described polymeric-carbon black masterbatches can also be oil extended with any of the known rubber extender oils. The oils that can be employed in the present invention are referred to in the art as "compatible oils" or "compatible rubber extending oils." Among the compatible oils are those ordinarily derived from petroleum, although they may be derived from coal tar or other suitable source. Generally, they have a viscosity of about 10 cs. at 210° F. up to more or less solid materials softening at about 100 to 200° F., have a boiling point of at least 300° F. at 10 mm. Hg and have a specific gravity (60/60° F.) of about 0.9 to 1.05. These are primarily higher hydrocarbons and can be vacuum distillates of petroleum as well as extracts and/or raffinates of such distillates. Also suitable are residues of petroleum distillation operations. Especially suited are extending oils of the type known as highly aromatic oils. The amount of extender oil employed will vary appreciably depending upon the particular polymeric material being extended, but in general the amount of oil will range up to about 100 weight percent of the carbon black present, preferably from about 10 to about 50 weight percent of the carbon black present.

Other materials can be incorporated into the polymers stabilized according to the invention prior to, together with, or subsequent to the addition of the stabilizers of the invention. These include pigments, dyes, other stabilizers, antistatic agents, fillers, softeners, stress cracking inhibitors, vulcanizing agents, vulcanization accelerators, etc.

The following examples will illustrate the present invention in greater detail but are not to be construed as limiting the invention.

The high cis-polybutadiene used in the masterbatches that were used in the tests reported in Examples I and II was prepared by polymerizing butadiene in a reactor system consisting of two parallel trains having three 4,000 gallon stirred reactors in each train followed by a common reactor, using the following recipe:

| | |
|---|---:|
| Butadiene _____lb./min__ | 152.3 |
| Toluene _____lb./min__ | 1350.0 |
| Triisobutylaluminum _____p.h.m[1]__ | 0.63 |
| Iodine _____p.h.m__ | 0.186 |
| Titanium tetrachloride _____p.h.m__ | 0.0563 |

[1] Part per 100 parts of monomer.

Reaction was initiated at 45° F. and the temperature was allowed to rise to about 75° F. Residence time in each of the reactors in the parallel trains was 37.4 minutes and in the common reactors was 18.7 minutes. After addition of 0.43 p.h.r. (parts per 100 parts of rubber) of Cyanox SS[2,2' - methylene-bis-(4-methyl-6-tert-butylphenol)], a commercial antioxidant, and 2.0 p.h.r. of Resin 731D (a disproportionated pale rosin stable to heat and light) shortstop, the effluent from the final common reactor was steam stripped for recovery of the rubber crumb, and the crumb was water-washed and dried. Conversion was 80 percent to a polybutadiene having the following properties:

| | |
|---|---:|
| Microstructure, percent [3] | |
|    Cis _____ | 93.3 |
|    Trans _____ | 3.2 |
|    Vinyl _____ | 3.5 |
| Inherent Viscosity [1] _____ | 2.53 |
| Gel, percent [2] _____ | 0 |

[1] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the botom of the bottle supported the cage with minimum contact. The bottle containing the cage was weighed to the nearest 0.02 gram during a minimum 3 minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

[3] Polymer samples were dissolved in carbon disulfide to form a solution having 25 grams of polymer per liter of solution. The infrared spectrum of each of the solutions (percent transmission) was then determined in a conventional infrared spectrometer.

The percent of the total unsaturation present as trans 1,4- was calculated according to the following equation and consistent units: $\varepsilon = E/tc$, where $\varepsilon$=extinction coefficient (liters-mols$^{-1}$-centimeters$^{-1}$); $E$=extinction ($\log I_0/I$); $t$=path length (centimeters); and $c$=concentration (mols double bond/liter). The extinction was determined at the 10.35 micron band and the extinction coefficient was 146 (liter-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

A polybutadiene/black/oil masterbatch was prepared by milling together the following ingredients:

| | Parts by weight |
|---|---:|
| High-cis-polybutadiene _____ | 100 |
| Philblack I[4] _____ | 60 |
| Philrich 5[5] _____ | 20 |

[4] An intermediate super-abrasion furnace black.
[5] A highly aromatic extender oil.

This masterbatch was used in the tests reported in Example I.

Example I

Dodecahydro-1,4,7,9b-tetraazaphenalene was employed as an antioxidant for a cis-polybutadiene/carbon black/aromatic oil masterbatch. Three masterbatch samples were prepared and tested for oxygen absorption at 100° C. In each case the masterbatch was milled into a strip about 0.03 inch thick and a one-gram portion of the strip was supported on glass wool that was in turn supported on aluminum foil in an oxygen absorption tube. The time required for the absorption of 10 cc. of oxygen at 100° C. was determined. In the first, second and fifth samples, the 0.43 p.h.r. of Cyanox SS, 2,2'-methylene-bis-(4-methyl-6-tertbutyl phenol), that was originally added to the polymer was present. In the third and fourth samples, Cyanox SS was removed by dissolving the cis-polybutadiene in toluene, precipitating it with methanol, and vacuum drying it at room temperature. This procedure reduced the Cyanox content to 0.04 percent which was considered negligible. One sample was prepared without carbon black and oil. Results of the tests are shown in Table I.

TABLE I

| Run No. | Antioxidant | | | Sample | Hrs. to Absorb 10 cc. O₂ per g., Sample |
|---|---|---|---|---|---|
| | Type | phr.[1] | mhr.[2] | cis-PBd [5]/C Black/Oil, Parts by Weight | |
| 1 | Amine RC-94 [3] | 0.98 | 5.4 | 100/60/20 | 125 |
| 2 | Ionol [4] | 1.5 | 6.8 | 100/60/20 | 53 |
| 3 | None | | | 100/0/0 | 15 |
| 4 | do | | | 100/60/20 | 30 |
| 5 | do | | | 100/60/20 | 33 |

[1] Parts by weight per 100 parts by weight rubber.
[2] Millimoles per 100 parts rubber.
[3] Dodecahydro-1,4,7,9b-tetraazaphenalene.
[4] 2,6-di-tert-butyl-4-methylphenol.
[5] Polybutadiene.

The data demonstrates the efficiency of dodecahydro-1,4,7,9b-tetraazaphenalene, an antioxidant of this invention, for stabilizing the cis-polybutadiene masterbatch.

Example II

Amine RC-94, dodecahydro - 1,4,7,9b-tetraazaphenalene, was employed at two levels in Banbury prepared masterbatches. The masterbatches were then aged at 160° F. for periods of 2,4,6, and 8 weeks after which the compounding ingredients were added on the mill. The stocks were cured 30 minutes at 307° F. and physical properties determined. Runs were also made in which Ionol was used instead of Amine RC-94 and one composition was prepared without antioxidant. Compounding recipes and physical properties of vulcanizates are given in Table II.

TABLE II

| | Compounding Recipes, Parts by Weight | | | | |
|---|---|---|---|---|---|
| | 1 | 2 | 3 | 4 | 5 |
| Cis-Polybutadiene [1] | 100 | 100 | 100 | 100 | 100 |
| Philblack I [1] | 70 | 70 | 70 | 70 | 70 |
| Zinc oxide | 3 | 3 | 3 | 3 | 3 |
| Stearic acid | 2 | 2 | 2 | 2 | 2 |
| Flexamine [2] | 1 | 1 | 1 | 1 | 1 |
| Philrich 5 [1] | 30 | 30 | 30 | 30 | 30 |
| Sulfur | 1.85 | 1.85 | 1.85 | 1.85 | 1.85 |
| Santocure NS [3] | 1.45 | 1.45 | 1.45 | 1.45 | 1.45 |
| Amine RC–94 [1] | [4] 0.75 | [5] 1.5 | | | |
| Ionol [1] | | | [6] 0.75 | [7] 1.5 | |

| | Physical Properties, Cured 30 Minutes at 307° F. | | | | |
|---|---|---|---|---|---|
| | 1 | 2 | 3 | 4 | 5 |
| $\mu \times 10^4$, Moles/cc.: | | | | | |
| Original | 1.59 | | 1.64 | 1.77 | 1.71 |
| Aged 2 weeks at 160° F | 1.58 | 1.66 | 1.53 | 1.46 | 1.44 |
| Aged 4 weeks at 160° F | 1.51 | 1.75 | 1.40 | 1.36 | 1.36 |
| Aged 6 weeks at 160° F | 1.52 | 1.59 | 1.36 | 1.48 | 7.58 |
| Aged 8 weeks at 160° F | 1.52 | 1.72 | 1.39 | 1.26 | |
| $\Delta T$, °F.: | | | | | |
| Original | 62.8 | | 58.9 | 60 | 60.3 |
| Aged 2 weeks at 160° F | 62.0 | 59.5 | 63.0 | 63.3 | 69.6 |
| Aged 4 weeks at 160° F | 67.4 | 60.5 | 69.4 | 68.8 | 82.2 |
| Aged 6 weeks at 160° F | 68.6 | 61.7 | 73 | 68.3 | 83.9 |
| Aged 8 weeks at 160° F | 72.8 | 62.7 | 83 | 81.3 | |
| Resilience, percent: | | | | | |
| Original | 65.1 | | 65.8 | 66.3 | 65.3 |
| Aged 2 weeks at 160° F | 68.9 | 70.3 | 66.3 | 65.3 | 65.5 |
| Aged 4 weeks at 160° F | 69.4 | 71.2 | 66.0 | 64.8 | 66.8 |
| Aged 6 weeks at 160° F | 69.8 | 71.2 | 67.9 | 67.3 | 65.9 |
| Aged 8 weeks at 160° F | 68 | 69.6 | 64.2 | 64.8 | |
| 300% Modulus, p.s.i.: | | | | | |
| Original | 1,070 | | 1,150 | 1,080 | 1,190 |
| Aged 2 weeks at 160° F | 1,340 | 1,360 | 1,180 | 1,100 | 1,140 |
| Aged 4 weeks at 160° F | 1,270 | 1,360 | 1,160 | 1,040 | 1,160 |
| Aged 6 weeks at 160° F | 1,120 | 1,340 | 1,070 | 1,070 | 1,170 |
| Aged 8 weeks at 160° F | | 1,440 | 1,240 | 1,010 | |
| Tensile, p.s.i.: | | | | | |
| Original | 2,480 | | 2,550 | 2,270 | 2,390 |
| Aged 2 weeks at 160° F | 2,540 | 2,580 | 2,380 | 2,030 | 2,100 |
| Aged 4 weeks at 160° F | 2,320 | 2,130 | 2,210 | 2,425 | 1,330 |
| Aged 6 weeks at 160° F | 1,680 | 1,930 | 1,730 | 2,040 | 1,230 |
| Aged 8 weeks at 160° F | 1,150 | 1,980 | 1,580 | 1,750 | |
| Elongation, percent: | | | | | |
| Original | 520 | | 510 | 480 | 480 |
| Aged 2 weeks at 160° F | 480 | 475 | 485 | 460 | 450 |
| Aged 4 weeks at 160° F | 440 | 400 | 465 | 520 | 325 |
| Aged 6 weeks at 160° F | 385 | 385 | 410 | 480 | 310 |
| Aged 8 weeks at 160° F | 265 | 370 | 350 | 420 | |

[1] Added during masterbatch preparation.
[2] Physical mixture containing 65 percent of a complex diarylamine-ketone reaction product and 35 percent of N,N'-diphenyl-p-phenylenediamine.
[3] N-tert-butyl-2-benzothiazolesulfenamide.
[4] 4.1 mhr.
[5] 8.2 mhr.
[6] 3.4 mhr.
[7] 6.8 mhr.

These data show that aging produced less change in the crosslinking value ($\nu \times 10^4$, moles/cc.) when Amine RC–94, an antioxidant, of the invention, was present in the masterbatch than when Ionol, a commercial antioxidant was used. Likewise there was less change in heat build-up in the compositions containing Amine RC–94 than in those containing Ionol. The change in resilience was not great but the data show some advantage when Amine RC–94 was used.

Reasonable variation and modification are possible within the scope of the foregoing disclosure and the appended claims to the invention, the essence of which is that polymeric material subject to oxidative degradation are inhibited against such degradation by incorporation therein of certain 1,4,7-9b-tetraazaphenalene compounds.

I claim:

1. A composition of matter of increased stability against oxidative degradation comprising:
 (a) a polymer selected from natural rubber and solid polymers of monoolefins having from 2 to 8 carbon atoms and rubbery synthetic polymers formed by polymerizing conjugated dienes having 4 to 12 carbon atoms, and
 (b) a stabilizing amount from 2 to 20 millimoles of (b) per weight 100 parts of (a) of a 1,4,7-9b-tetraazaphenalene compound of the formula:

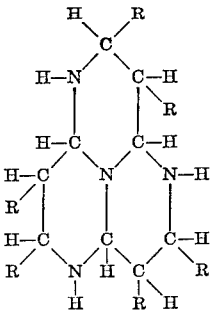

wherein R is selected from hydrogen and monovalent hydrocarbon radicals selected from saturated aliphatic, saturated cycloaliphatic, and aromatic radicals, and combinations thereof, containing up to and including 12 carbon atoms.

2. A composition according to claim 1 which contains (c) from 0.5 to 250 weight parts carbon black per 100 weight parts of (a).

3. A composition according to claim 2 which contains (d) an extender oil in amounts up to 100 weight percent of the carbon black (c) present in said composition.

4. A composition of matter comprising (a) a rubbery polymer of a conjugated diene having from 4 to 12 carbon atoms per molecule, (b) from about 0.5 to about 250 weight parts carbon black per 100 weight parts of rubber, and (c) from about 2 to about 20 millimols of a stablizing compound having a formula as defined in claim 1.

5. A composition according to claim 4 wherein said rubbery polymer is polybutadiene having a high percentage of cis-1,4-addition.

6. A composition of matter comprising polybutadiene, from 10 to 150 weight parts carbon black per 100 weight parts polybutadiene, from 10 to 50 weight percent of an aromatic extender oil based on carbon black, and from 2 to 20 millimols of dodecahydro-1,4,7,9b-tetraazaphenallene per 100 weight parts polybutadiene.

7. A composition of matter comprising cis-polybutadiene, and per 100 weight parts of cis-polybutadiene, 10–150 weight parts of carbon black, 10–150 weight percent of a highly aromatic extender oil based on carbon black, and from 4 to 15 millimols of dodecahydro-1,4,6,9b-tetraazaphenalene.

8. A composition according to claim 6 wherein said polybutadiene contains a high percentage of cis-1,4-addition.

9. A cured rubber composition of matter comprising a high cis-polybutadine, and per 100 weight parts of polybutadiene, 10–150 weight parts carbon black, 10–50 weight percent of a highly aromatic extender oil based on carbon black, and from 2 to 20 millimols of dodecahydro-1,4,7,9b-tetraazaphenalene.

References Cited

UNITED STATES PATENTS

| | | | |
|---|---|---|---|
| 3,112,315 | 11/1963 | Van Winkle | 260—256.4 |
| 2,658,895 | 11/1953 | Ballard | 260—800 |
| 2,388,562 | 11/1945 | Neal | 260—800 |
| 2,705,224 | 3/1955 | Hill | 260—285 |
| 3,196,126 | 7/1965 | Wald | 260—33.6 |
| 3,203,922 | 8/1965 | Hammer | 260—33.6 |

OTHER REFERENCES

Shell: Technical Information Bulletin, April 1963, Amine R–C–94, pages 1–6, copy in S.L. 260—256.4.
Brown: Rubber World, pp. 70–76, November 1961.

JULIUS FROME, *Primary Examiner.*